United States Patent [19]

Bellare et al.

[11] Patent Number: 5,757,913

[45] Date of Patent: May 26, 1998

[54] METHOD AND APPARATUS FOR DATA AUTHENTICATION IN A DATA COMMUNICATION ENVIRONMENT

[75] Inventors: Mihir Bellare, New York; Roch Andre Guerin, Yorktown Heights, both of N.Y.; Phillip Walder Rogaway, Austin, Tex.

[73] Assignee: International Business Machines Corporation, Armonk, N.Y.

[21] Appl. No.: 52,304

[22] Filed: Apr. 23, 1993

[51] Int. Cl.$^6$ .................. H04L 9/00; H04L 9/06
[52] U.S. Cl. ............... 380/23; 380/25; 380/29; 380/46; 380/49; 380/50
[58] Field of Search .................. 380/4, 21, 23, 380/24, 25, 29, 30, 43, 46, 49, 50; 340/825.31, 825.34

[56] References Cited

U.S. PATENT DOCUMENTS

| | | | |
|---|---|---|---|
| 4,349,695 | 9/1982 | Morgan et al. | 380/25 |
| 4,747,050 | 5/1988 | Brachtl et al. | 340/825.34 X |
| 4,881,264 | 11/1989 | Merkle | 380/25 |
| 4,890,323 | 12/1989 | Beker et al. | 380/25 |
| 4,908,861 | 3/1990 | Brachtl et al. | 380/25 |
| 4,933,869 | 6/1990 | Gareis et al. | 364/483 |
| 4,933,969 | 6/1990 | Marshall et al. | 380/25 |
| 4,965,827 | 10/1990 | Mcdonald | 380/25 |
| 4,969,189 | 11/1990 | Ohta et al. | 380/25 |
| 5,007,089 | 4/1991 | Matyas et al. | 380/49 |
| 5,010,572 | 4/1991 | Bathrick et al. | 380/21 |

OTHER PUBLICATIONS

"Financial Institution Message Authentication", ANSI X9.9, 18 pp.; 1986.

B. J. Chorley et al. "A Revised Definition of a Secure Communication Protocol and Its Implementation", National Physical Laboratory Report DITC May 1982, Apr. 1982.

D. W. Davies et al. "A Message Authenticator Algorithm Suitable for a Main Frame Computer", National Physical Laboratory Report DITC 1783, Feb., 1983.

"Message Authentication with Partial Encryption", Research Disclosure, Dec. 1988, #296, Kenneth Mason Publications Ltd, England, 1 page.

R. E. Lennon et al. "Transaction Response Message Authentication (Public Key and Des)", IBM Technical Disclosure Bulletin, vol. 26, #8, Jan. 1984, pp. 4118–4120.

O. Goldreich et al. "How to Construct Random Functions", Journal of the Association for Computing Machinery, vol. 33, No. 4, Oct. 1986, pp. 792–807.

O. Goldreich et al. "On the Cryptographic Applications of Random Functions", Laboratory for Computer Science, M.I.T., pp. 276–287, No Date.

R. R. Jueneman et al. "Message Authentication", IEEE Communications Magazine, vol. 23, #9, Sep. 1985.

"Data Encryption Standard", Federal Information Processing Standards Publication 46, Jan. 15, 1977, pp. 659–670.

(List continued on next page.)

*Primary Examiner*—Bernarr E. Gregory
*Attorney, Agent, or Firm*—Wayne P. Bailey; Jeffrey S. LaBaw

[57] ABSTRACT

A method and system for providing data authentication, within a data communication environment, in a manner which is simple, fast, and provably secure. A data message to be sent is partitioned into data blocks. Each data block is combined with a block index to create a word. A pseudo-random function is applied to each word to create a plurality of enciphered data strings. An identifying header, comprising the identity of the sender and a counter value, is also enciphered using a pseudo-random function. These enciphered data strings and header are logically combined to create a tag. As the enciphering of a particular word occurs independent of the other words, each block can be enciphered independently of the others. The method and system can thus be performed and structured in either a parallel or pipelined fashion. A receiving component or system generates a second tag which can then be compared with the transmitted tag to determine message authentication.

44 Claims, 9 Drawing Sheets

OTHER PUBLICATIONS

B. Preneel et al, "Collision–Free Hashfunctions Based on Blockcipher Algorithms", ICCST, 1989, Zurich, Switzerland, pp. 203–210.

A. Beutelspacher et al, "Perfect and Essentially Perfect Authentication Schemes", Siemens AG, Federal Republic of Germany, pp. 167–170, No Date.

P. G. Comba et al, "Exponentiation Cryptosystems on the IBM PC", IBM Systems Journal, vol. 29, No. 4, 1990, pp. 526–538.

S. Goldwasser et al, "Digital Signature Scheme Secure Against Adaptive Chosen–Message Attacks", SIAM J. Comput., vol. 17, No. 2, Apr. 1988, pp. 281–309.

METHOD AND APPARATUS FOR DATA AUTHENTICATION IN A DATA COMMUNICATION ENVIRONMENT

TECHNICAL FIELD

This invention relates to data communication procedures, and more specifically to procedures for providing authenticated data when using an insecure communication medium.

BACKGROUND OF THE INVENTION

In communication systems, it is common for two parties to want to be able to communicate over an insecure channel in a way which allows each party to have confidence that a message received by one party was in fact produced by the other party. An insecure channel is one where a third party can monitor and/or study message traffic across a communication link, as well as inject messages of their own. It can be assumed that the two communicating parties are in possession of, or can obtain, a short, random and secret key. To achieve such communications over an insecure channel, a variety of techniques are known in the art, as surveyed in "Message Authentication", by Juememan, R., Matyas, S., and Meyer, C., IEEE Communications, September 1985, and hereby incorporated by reference as background material. One of the known techniques provides that either party attaches to each message to be sent a short Message Authentication Code (MAC) computed as a function of the message, the secret key and possibly other arguments.

These types of systems are known in the art, as exemplified by the ANSI X9.9 standard (ANSI X9.9, 1982), and hereby incorporated by reference as background material. However, this system is lacking in that the rate at which the MAC can be computed is limited by the rate at which an underlying cryptographic operation can be carried out. As shown in FIG. 10, which depicts the mechanism of ANSI X9.9, the limitation is caused by the sequential nature of the mechanism, which consists of breaking a message down into blocks, encrypting a block, exclusive-Or'ing the encrypted block with the next block of the message, encrypting the result, and so forth until all the blocks have been processed. Thus, each block must wait for all preceding blocks to be encrypted and exclusive-Or'ed as specified before that block can be utilized. This sequential processing becomes a problem with networks of very high speed, where the arrival rate of blocks is faster than the inverse of the amount of time required to process a single block. On such a network, providing extra hardware will not help to compute the MAC any faster, because the cause of the bottleneck is the amount of time it takes to compute the cryptographic primitive, and not the lack of resources for doing the computation. For such a network, one would have to slow down transmission times to match the rate at which the cryptographic primitive could be computed. Thus, the overall system throughput in high speed networks can be greatly impacted by this type of sequential message tag calculation, resulting in inefficient transfer of information.

SUMMARY OF THE INVENTION

A method and apparatus for providing data authentication, within a data communication environment, in a manner which is simple, fast, and provably secure. Authentication codes are created and verified in such a way that the operations can be performed in a parallel, or pipelined, fashion. By use of these authentication codes, data can be securely received even though the data is transmitted over an insecure communication network.

More specifically, the present invention provides a way of computing a Message Authentication Code (MAC) in a manner which is simple, fast, and provably secure. The data to be sent is divided into data blocks which are consecutively indexed 1, 2, 3, ..., n. For each block i, a word $x_i$ is created by encoding the contents of block i and the index i (identifier). A pseudo-random function is applied to each word $x_i$ to create an enciphered word $y_i$. Additionally, an identifying sequence number $x_0$ (header) is created by encoding the identity of the sender and a counter. A pseudo-random function is applied to the identifying header $x_0$ to generate an enciphered header $y_0$. These enciphered words and enciphered header are logically combined to create a tag t. The tag t, together with the identity of the sender (ID_A) and the value of a counter (CTR) form the Message Authentication Code. In the preferred embodiment, the pseudo-random function is the algorithm of the data encryption standard (DES), and block sizes, etc. are chosen accordingly.

Computing of the pseudo-random function can be done independently for each word $x_i$ (e.g. in a parallel or pipelined manner), as the pseudo-random function is applied to each word independent of the other words. The method and system can thus be performed and structured in either a parallel or pipelined fashion. The size of the tag is independent of message length. A receiving component or system generates a second tag which can then be compared with the transmitted tag in determining message authenticity.

It is therefore an object of the present invention to provide an improved data processing system.

It is a further object of the present invention to provide an improved data transfer procedure for a data processing system.

It is yet a further object of the present invention to provide an improved authentication system for data in a nonsecure communication environment.

It is yet a further object of the present invention to provide an improved method for determining a message authentication code to be used in authenticating messages being transferred in a data processing system.

These, and other, objects and advantages of the present invention will be further described below in the detailed description of the drawing.

DETAILED DESCRIPTION OF THE PREFERRED EMBODIMENT

Figure 1:
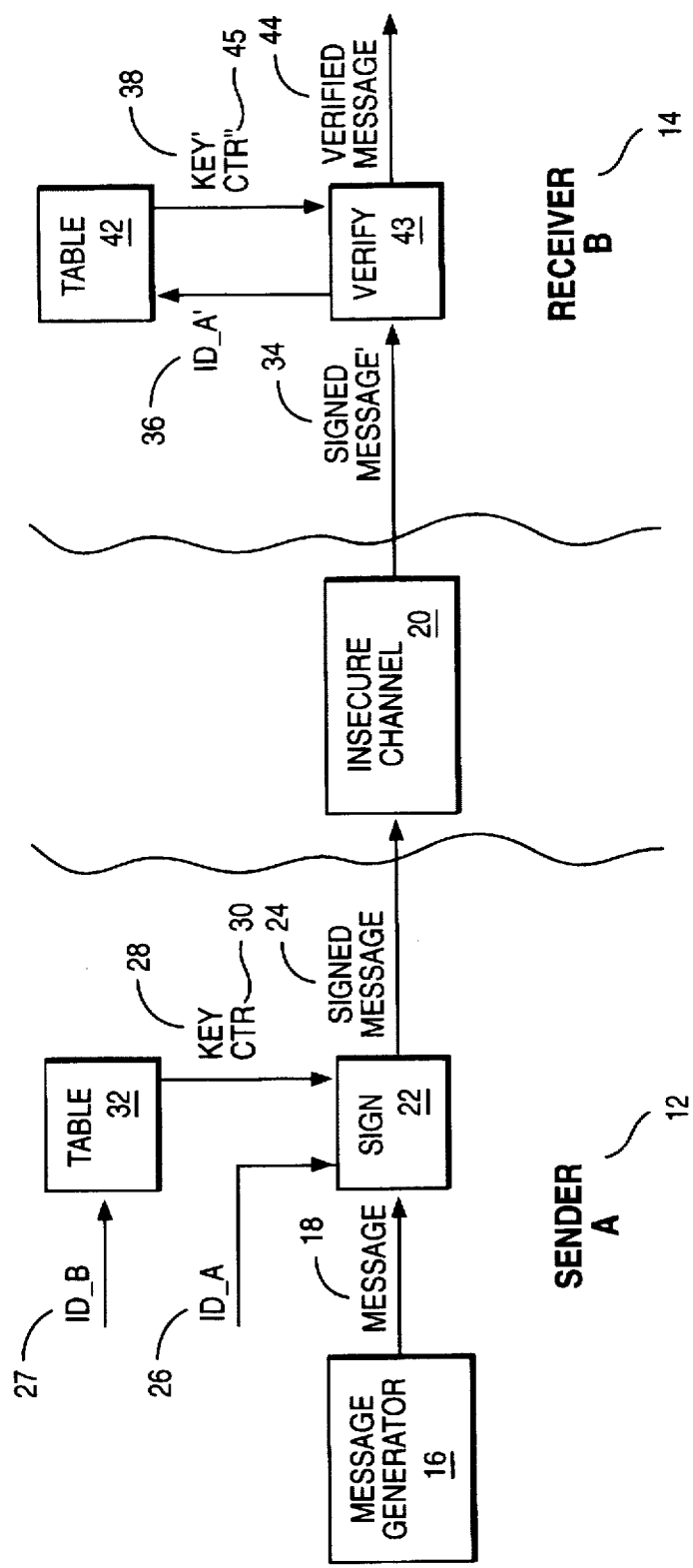
FIG. 1 is a system overview of a data communication system which protects the integrity of transmitted messages.

Referring to FIG. 1, a sender 12 is trying to send messages, or data, securely to some receiver 14. The sender and receiver might be computers, communication cards, switches, or other computational entities. A message generator 16 is producing messages for the sender 12. The contents of these messages must be transmitted over an insecure channel 20 to the receiver 14. The message generator 16 could be, for example, a lower-layer entity of a communications stack, a higher-layer application entity, a source for voice or video data, or other data source. The insecure channel 20 could be, for example, a physically exposed wire, a fiber optic cable, a wireless LAN, satellite channel, etc.

The receiver 14 wants to be confident that a message claimed to be sent by the sender 12 really was sent by the sender. To this end, the sender signs (i.e. authenticates) the message at 22. The signing of the message yields a signed message 24. The signing process 22 takes the message 18, an identity of the sender (ID_A) 26, a Key 28 shared by the sender and the receiver, and a counter (CTR) 30. Key and CTR are associated (via a table 32 using standard techniques) to the identities of the sender and receiver, and are both used in tag computation, as further described below. In the preferred embodiment, the associated Key 28 and CTR 30 are shown as being stored in a table 32 and indexed by the identity of the receiver ID_B 27, where the values can be obtained by the sign process 22 using conventional indexing techniques known in the art.

The signed message 24 is sent over the insecure channel 20. At the other end of the channel, some signed message' 34 is received by the receiver 14. This signed message' 34 may or may not be the same as the signed message 24. For example, a signed message' 34 could be received even though no signed message 24 was actually transmitted by the sender 12, as the transport channel 20 is insecure. Or an adversary could have modified some bits in the signed message.

The receiver 14 receives signed message' 34 and, by inspecting the signed message', extracts the claimed signer identity ID_A' 36. The receiver uses ID_A' 36 to look up its own Key' 38 shared with the party who has an identity = ID_A', and its own value of CTR" 45, using table 42 as indexed by ID_A'. The verify process 43 then takes the signed message' 34, ID_A' 36, Key' 38 and CTR' 40 and either recovers a verified message 44 or decides that the signed message' 34 is a forgery. If a forgery is detected, the message is discarded and other appropriate action may be taken.

Figure 2:
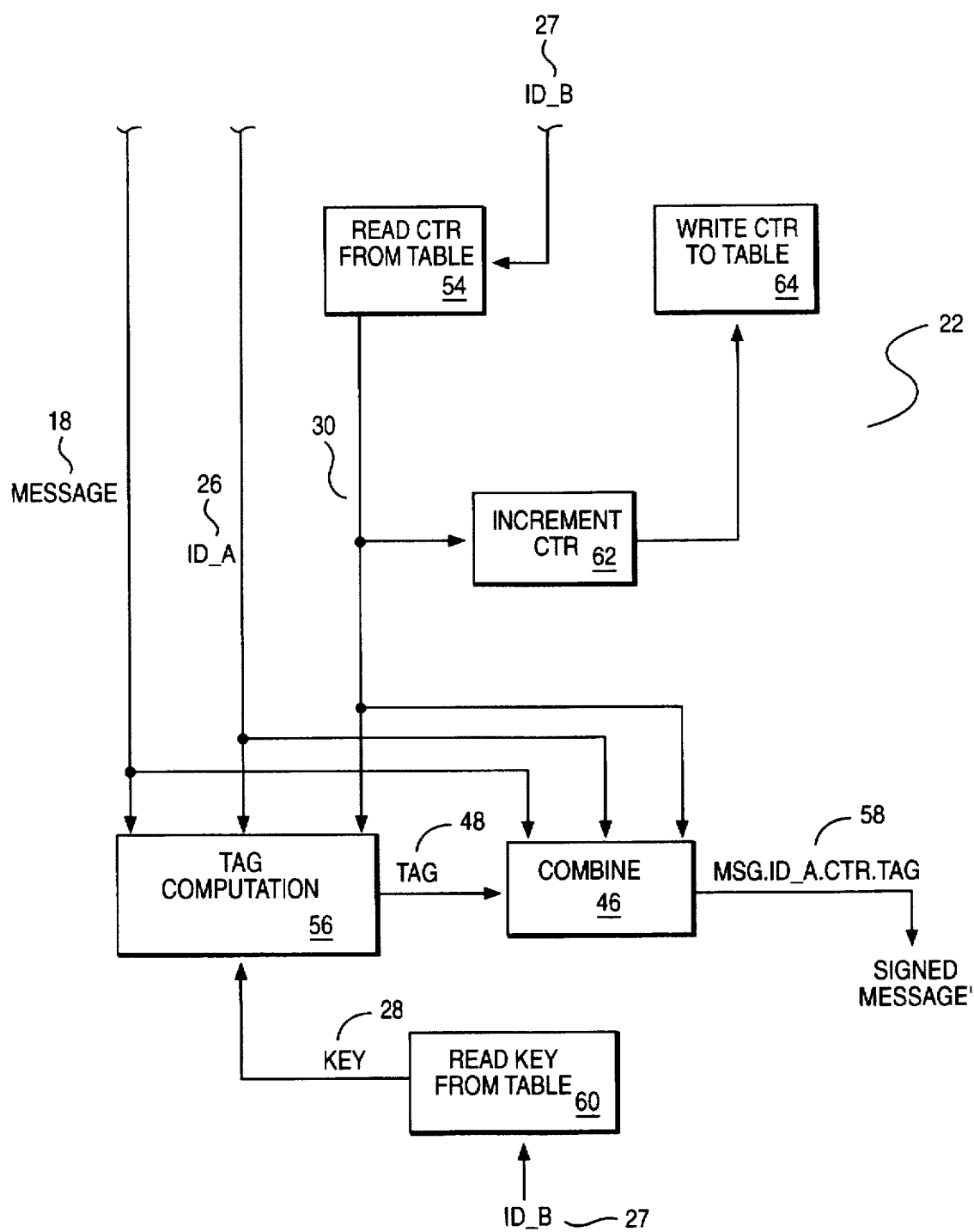
FIG. 2 shows the process for signing a message to be transferred using a communication medium.
Figure 8:
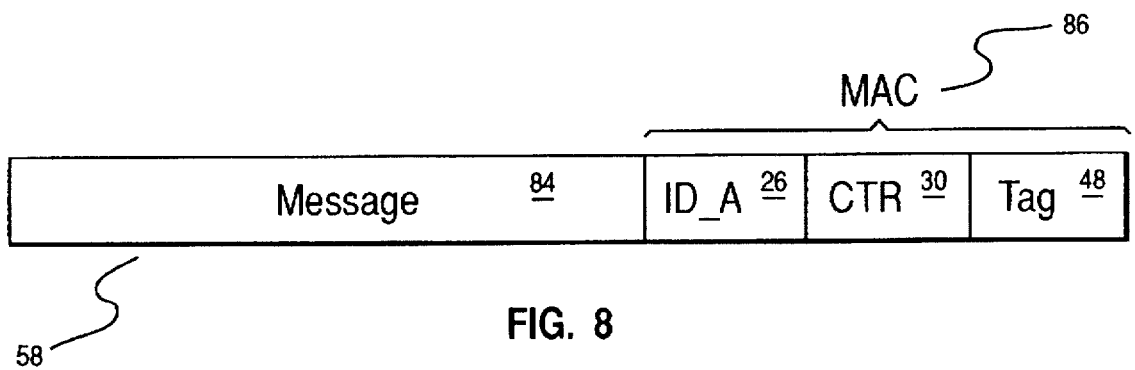
FIG. 8 shows the structure of a signed message.
Figure 10:
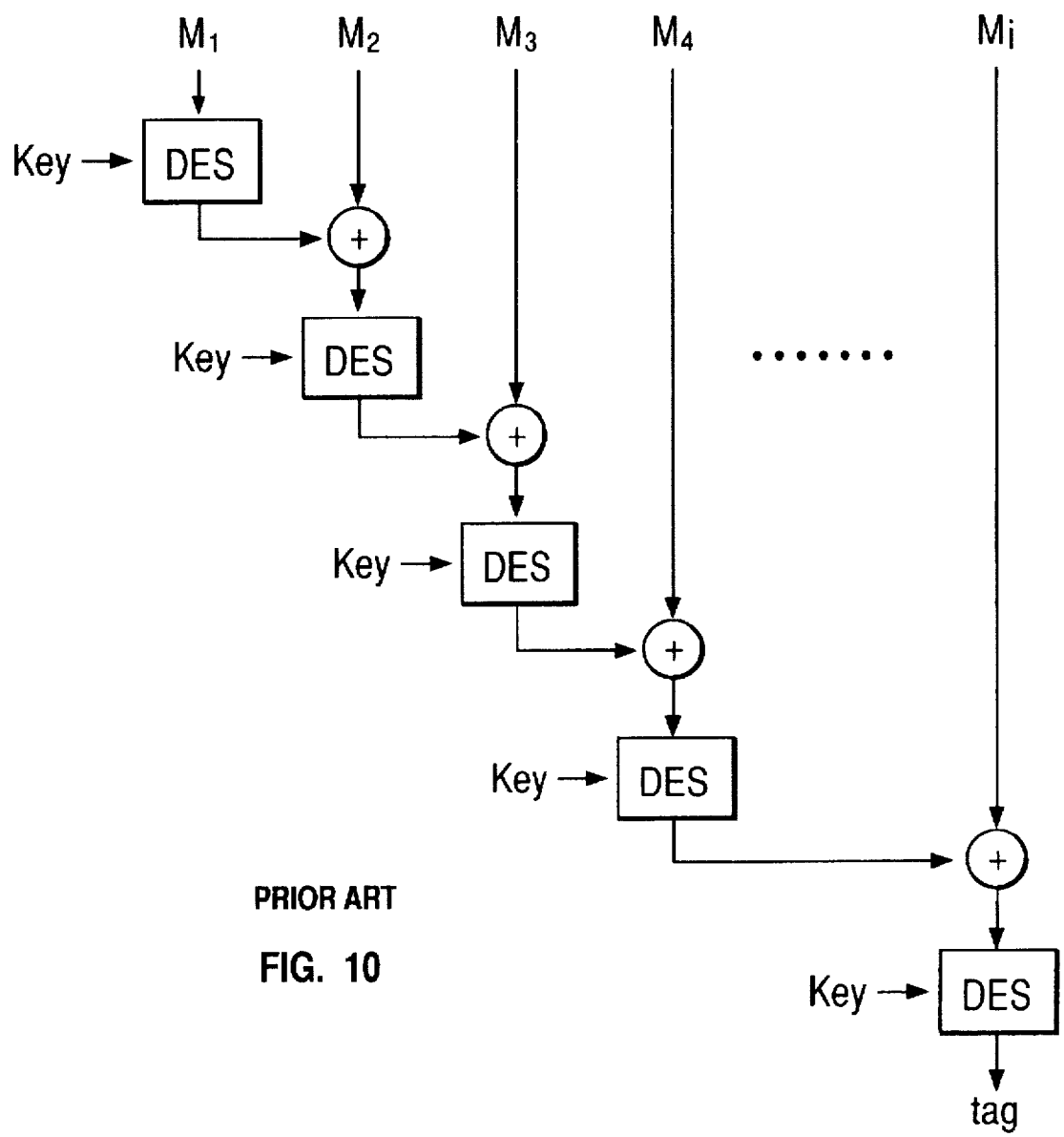
FIG. 10 depicts a sequential message authentication code determination technique.

FIG. 2 depicts in greater detail the signing process 22 of FIG. 1. This signing process 22 takes a message 18 and concatenates or otherwise combines/encodes at 46 this message with the identity of the sender, ID_A 26; the current value of the counter, CTR 30; and a tag 48. The CTR value is read from table 32 (of FIG. 1) at 54. The tag computation at 56 is later described with reference to FIG. 4, and includes reading a Key 28 from table 32 (of FIG. 1) at 60. The resultant concatenated string 58—Message.ID_A.CTR.Tag—is the signed message 24 of FIG. 1. The combined ID_A.CTR.Tag portion of this signed message (i.e. everything but the Message itself) is the message authentication code, or MAC, as further shown in FIG. 8 at 86.

With the signing of each message, the current value of the counter CTR is incremented, or otherwise changed to a new value, at 62. This value is saved in a table 32 (of FIG. 1) at 64, to be used to authenticate/sign the next message originating with ID_A.

Figure 3:
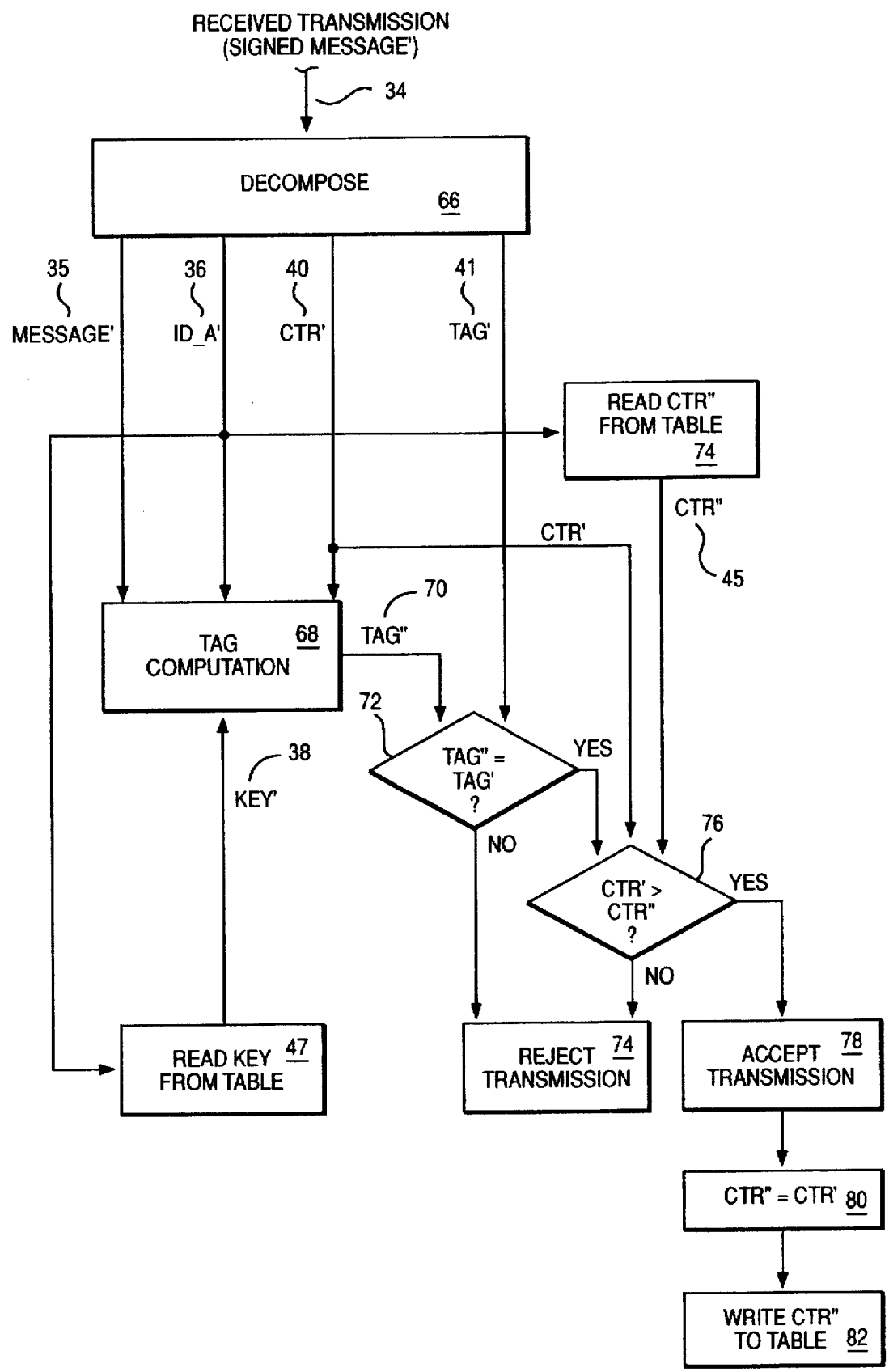
FIG. 3 depicts the process for authenticating received data.

Referring now to FIG. 3, a signed message' 34 comes into the receiver 14. It is decomposed at 66 to determine the constituent message' 35, ID_A' 36, CTR' 40, and Tag' 41. ID_A' 36 is used to index a table 42 (of FIG. 1) at 47 to obtain local Key' 38. Using message' 35, ID_A' 36, CTR' 40 and Key' 38, the receiver 14 computes at 68 a tag ("Tag" 70) which is appropriate for this received signed message' 34, using the same algorithm 56 that the sender 12 used to computer the tag 48 of FIG. 2. If Tag" 70 computed at 68 differs from the received Tag' 41, as determined at 72, the received transmission is regarded as non-authentic, and it is discarded at 74. If the tags agree, then the received counter CTR' 40 is compared to the receiver's own counter, CTR" 45 at 76, after reading CTR" 45 from table 42 (of FIG. 1) at 74. If the former is greater, the message is accepted at 78 and the receiver's counter CTR" 45 is replaced by the value of CTR' at 80 and written to table 42 (of FIG. 1) at 82. Otherwise, the received transmission is regarded as non-authentic, and it is discarded at 74.

The importance of the time variant parameter CTR" 45 is to ensure that once a message has been accepted for a given CTR' value, no additional messages will be accepted with the same CTR value. In the preferred embodiment, a counter is used which is incremented for each message, so that only the most recent value of CTR must be saved to ensure non-duplication of counter values. This leads to a problem, however, if the messages sent are received out of order from the order with which they were sent. This problem is solved by the receiver saving a k-element set S of the largest CTR' values received on messages regarded as authentic. In addition, the receiver saves a value CTR" (as previously described). A message is determined to be a replay (i.e. unauthentic) if its CTR' value is in the set S, or it has a value CTR'≦CTR". When an authentic message is received, its CTR' value is added to the set S, CTR" is replaced by the smallest element of the set, and the smallest element of S is then taken away from S. This ensures that duplicate CTR ' values are not accepted as valid.

Alternatively, other types of time variant parameters, such as a timestamp, could be used in place of counters. The sender would use its current time TIME in place of CTR previously described. The receiver accepts TIME' values which are within some delta-amount of the receiver's current time TIME", and which differ from every time-value Time' in the set S of already used time values. A time value TIME' is placed in this set S when a message is accepted that used this TIME' value. A Time' value is removed from the set S when it differs from the receiver's current time TIME" by more than the delta-amount. A block sequence number could also be used as a time variant parameter, using similar techniques.

Figure 4:
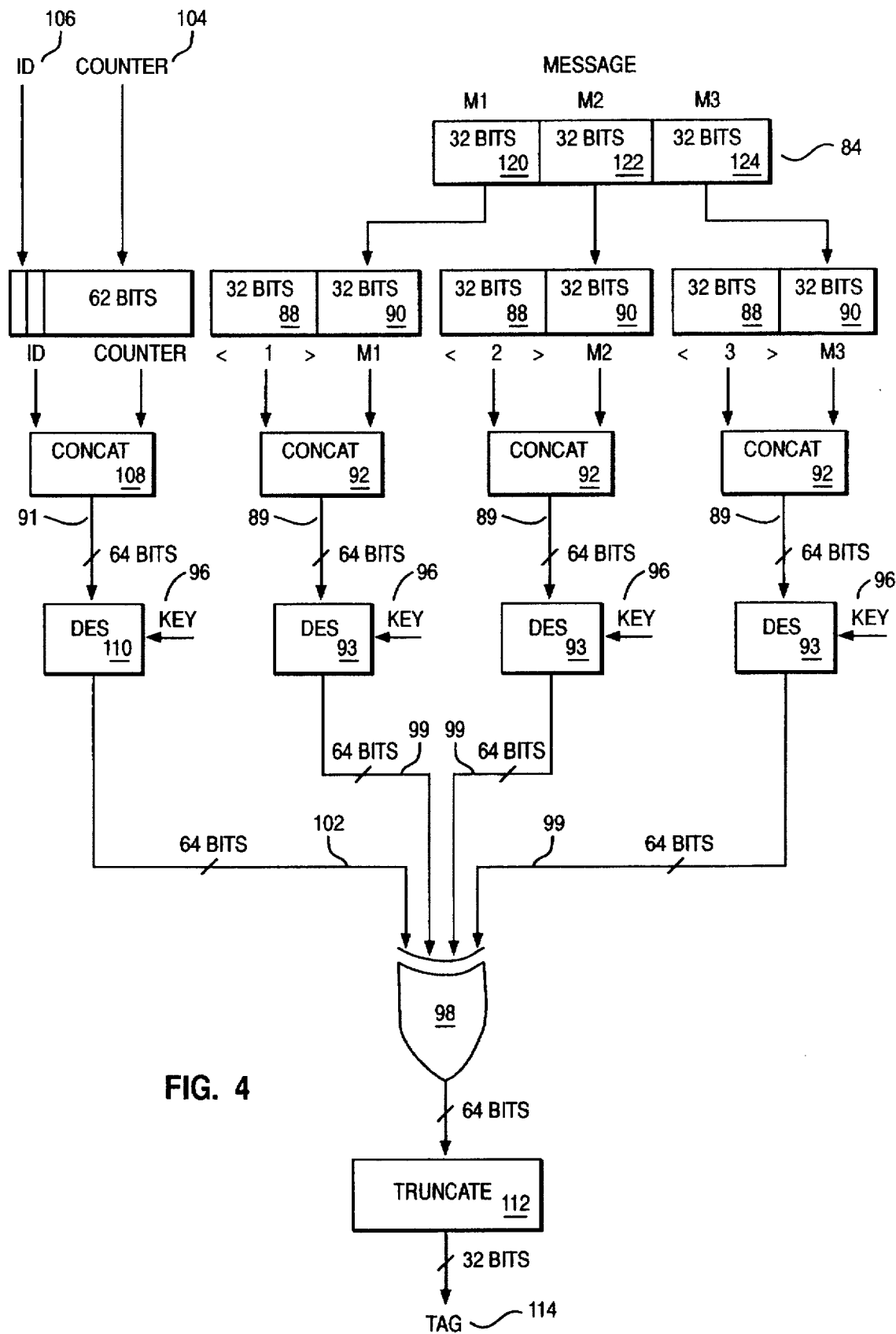
FIG. 4 is a functional depiction of tag computation for either a sender or receiver in a data processing system.

FIG. 4 depicts one embodiment of the tag computation 56 of FIG. 2 and 68 of FIG. 3, based on the algorithm of the Data Encryption Standard known in the art. This encryption standard is further described in the Federal Information Processing Standard (FIPS) Publication 46, National Bureau of Standards, U.S. Department of Commerce, Washington, D.C., January 1977, and hereby incorporated by reference as background material. The assumptions For the method shown in FIG. 4 are the following: first, that there is only one entity that sends message using the Key 28 (of FIG. 1), and so its identity ID_A 26 (of FIG. 1) is simply taken as the bit 0; second, there will be fewer than $2^{62}$ messages sent under key (afterwards, the key can be manually or automatically updated to a fresh key); and third, each message is of length less than $2^{31}$ 32-bit words. The number of messages that can be sent under key is determined by the number of bits accorded to the counter (62 bits in the preferred embodiment). The number of 32-bit words in a message is bounded by $2^{31}$, since the bit 0 is prefixed to the block index in the scheme, leaving only 31 bits to describe the block index/identifier.

Referring more particularly to FIG. 4, the message/data 84 is padded in some standard fashion so that it is a multiple of K=32 bits. The padding is not shown in FIG. 4, as it is commonly known in the data processing art. The message/data 84 is thought of as consisting of some number N of K-bit blocks. FIG. 4 shows an example message 84 where N=3 blocks (120, 122 and 124) and K=32 bits.

A 32-bit encoding of each block identifier is shown at 88. In the preferred embodiment, the first bit of this encoding is set to 0, and the remaining bits are a standard binary encoding of integer value i (the block index) for each respective block. The i-th 32-bit block of the message, written Mi and shown at 90, is concatenated at 92 to the end of the block identifier 88. The N resulting 64-bit blocks 89 are each enciphered at 93 using the algorithm of the Data Encryption Standard (DES). The Key 96 used in each case is Key 28 or Key' 38, depending on whether the sender or receiver is performing the tag computation. The resulting N ciphertexts 99 are all bitwise exclusive-ORed together at 98, along with one more ciphertext 102. This additional ciphertext 102 is generated as follows.

Additional ciphertext 102 is formed by binary encoding the counter 104 in the low 62 bits of a word. To this counter (CTR 30 or CTR' 40 of FIG. 1, depending on whether the sender or receiver is performing the tag computation) is prefixed the concatenation of the bit "1" (in the most significant bit location) and the identity of the sender (ID_A or ID_A', depending on whether the operation occurs in sender or receiver), which is assumed in the preferred embodiment to be 1 bit long. The first of these most significant bits is to separate the space of words which encodes the sender ID/CTRs from the space which encodes the message blocks. The second most significant bit is to indicate the identity of the sender. Space separation ensures that the decode portion can identify and distinguish between the counter block and a message block, as the sets will always be disjoint since the former always begins with a bit 1, and the later always begins with a bit 0. The resulting 64-bit word 91 is encrypted at 110 using the algorithm of the Data Encryption Standard. After this ciphertext 102 is exclusive-OR'ed with the other N ciphertexts 99, the resulting 64-bit string may be truncated at 112 to a smaller number of bits, here shown as having been truncated to 32 bits. Of course, the truncation can take place before the exclusive-OR 98 in an alternate embodiment. The resultant tag 114 is tag 48 of FIG. 2 or tag 70 of FIG. 3, depending on whether the sender or receiver is performing the tag computation.

Much of the method described above can be easily modified to create alternate embodiments, including:

Any encoding of message blocks 88 and 90, as long as distinct numbered blocks give rise to different encodings Other mechanisms can be used in place of DES, such as a pseudo-random function based on MD5, a hash function described in "The MD5 Message-Digest Algorithm", Network Working Group RFC 1321, by Rivest, R. et al, April 1992. Pseudo-random functions are generally known in the art, and are described by the article "How to Construct Random Functions", by Goldreich, O., Goldwasser, S. and Micali, S., Journal of the Association for Computing Machinery, Vol. 33, No. 4, October 1986, pp. 782–807, and hereby incorporated by reference as background material.

Alternative encodings of the ID 106 and the counter 104 are fine as long as the ID/CTR encodings are in a space different from the space of the encoding of the numbered message blocks; that is, <ID_A, CTR> is not equal to <i, m> for any i, m.

Enough bits must be used for the ID 106 to name each member of the group of entities who transmit data under the shared key. For example, if two entities wish to send messages to one another using a shared key, one bit suffices, with one of the two entities taking a name of "0" and the other taking a name of "1".

Figure 5:
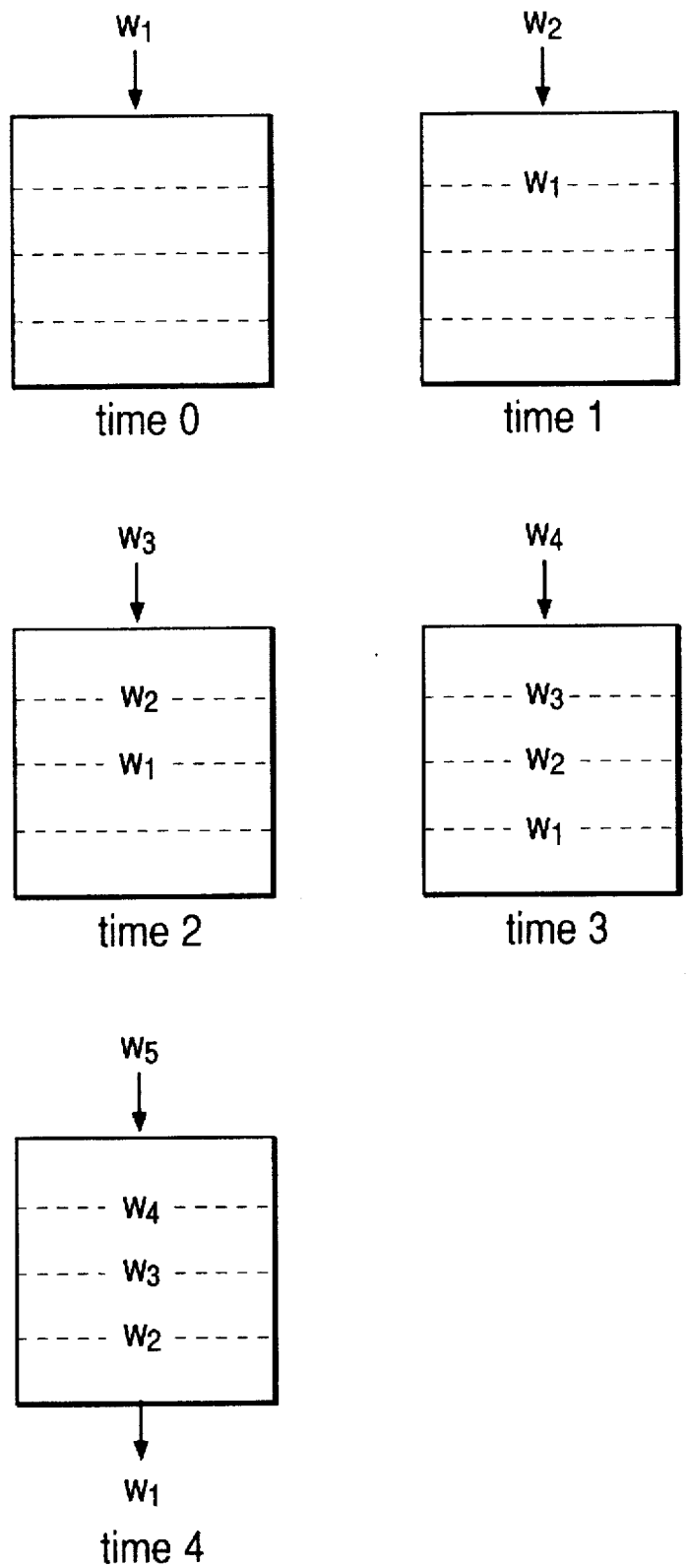
FIG. 5 depicts a multi-staged DES engine being used in a pipelined fashion.

Pipelining can also be easily adapted to the above described technique. Some DES engines have multiple, internally clocked stages, where data at a given stage is transferred to a subsequent stage when performing the encryption algorithm. Since the words can be encrypted independent from one another, a pipelined approach to encryption is possible. Referring now to FIG. 5, a single multi-staged DES engine is shown. The DES engine is depicted to have four stages, indicated with the dotted lines. For example, each stage might comprise four rounds of the DES computation. At time 0, word 1 is presented to the DES engine to being encryption processing. At time 1, word 1 (W1) passes to the second internal stage of the DES engine, and word 2 (W2) is presented to stage 1 of the engine. At time 2, word 1 passes to the third internal stage of the DES engine, word 2 passes to the second internal stage, and word 3 (W3) is presented to stage 1 of the engine. In a similar manner at time 3, word 1 passes to the fourth internal stage of the DES engine, word 2 passes to the third internal stage, word 3 passes to the second internal stage, and word 4 (W4) is presented to the first internal stage of the engine. Finally, at time 4, word 1 has been DES encrypted, and exits the engine, while a fifth word (W5) is presented to the first stage of such engine. As each word to be encrypted does not depend on an encrypted value of another word, the independent encryption operations can be performed in this pipelined fashion when using a DES engine that has independent internal stages that facilitate distinct operations amongst the stages.

Figure 6:
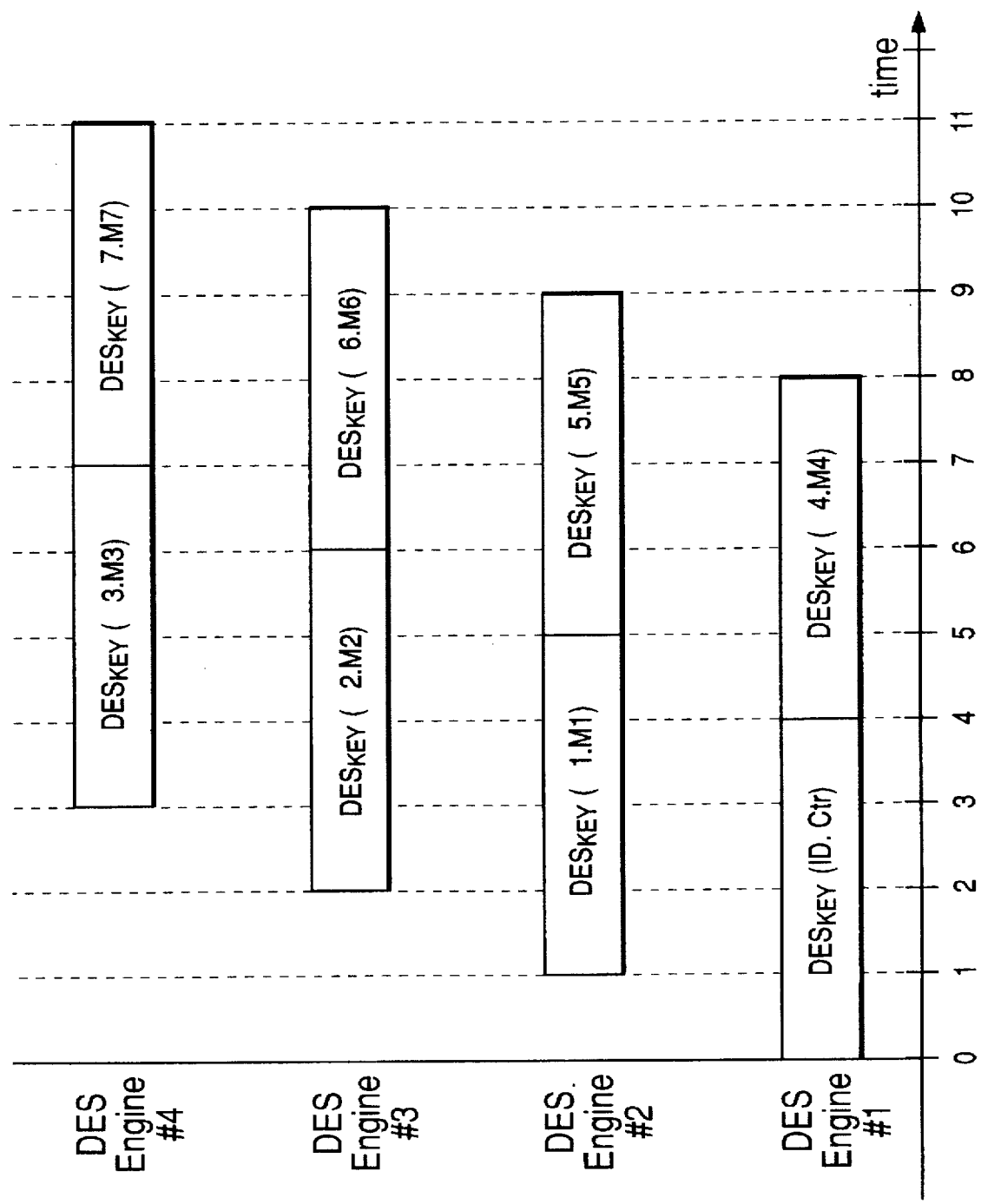
FIG. 6 illustrates a timing diagram for computing a tag to be used with data authentication.

FIG. 6 is a timing diagram to illustrate how the parallel MAC scheme can be used to match the bandwidth between a fast message generator 16 and a signing process 22 based on a slower pseudo-random function. For the timing of FIG. 6, assume the embodiment of FIG. 7 with four DES engines 134, 136, 138 and 140 available at both the sender and receiver. Further assume messages 132 are being generated at a rate of one 32-bit word every unit of time, but the underlying DES engines can only encrypt at a rate of one 64-bit word every four units of time. This timing diagram ignores the amount of time needed to exclusive-OR two words together, to concatenate words, increment counters, update counters, etc., as such time is generally significantly less than the time required to perform the encryption operations. The apparatus of FIG. 7 uses four DES engines (134, 136, 138 and 140) and incurs a latency which is only that of the latency of a single DES engine, regardless of the length of messages being authenticated. This parallelization thus provides significant throughput advantages over prior methods when message lengths are large.

Figure 7:
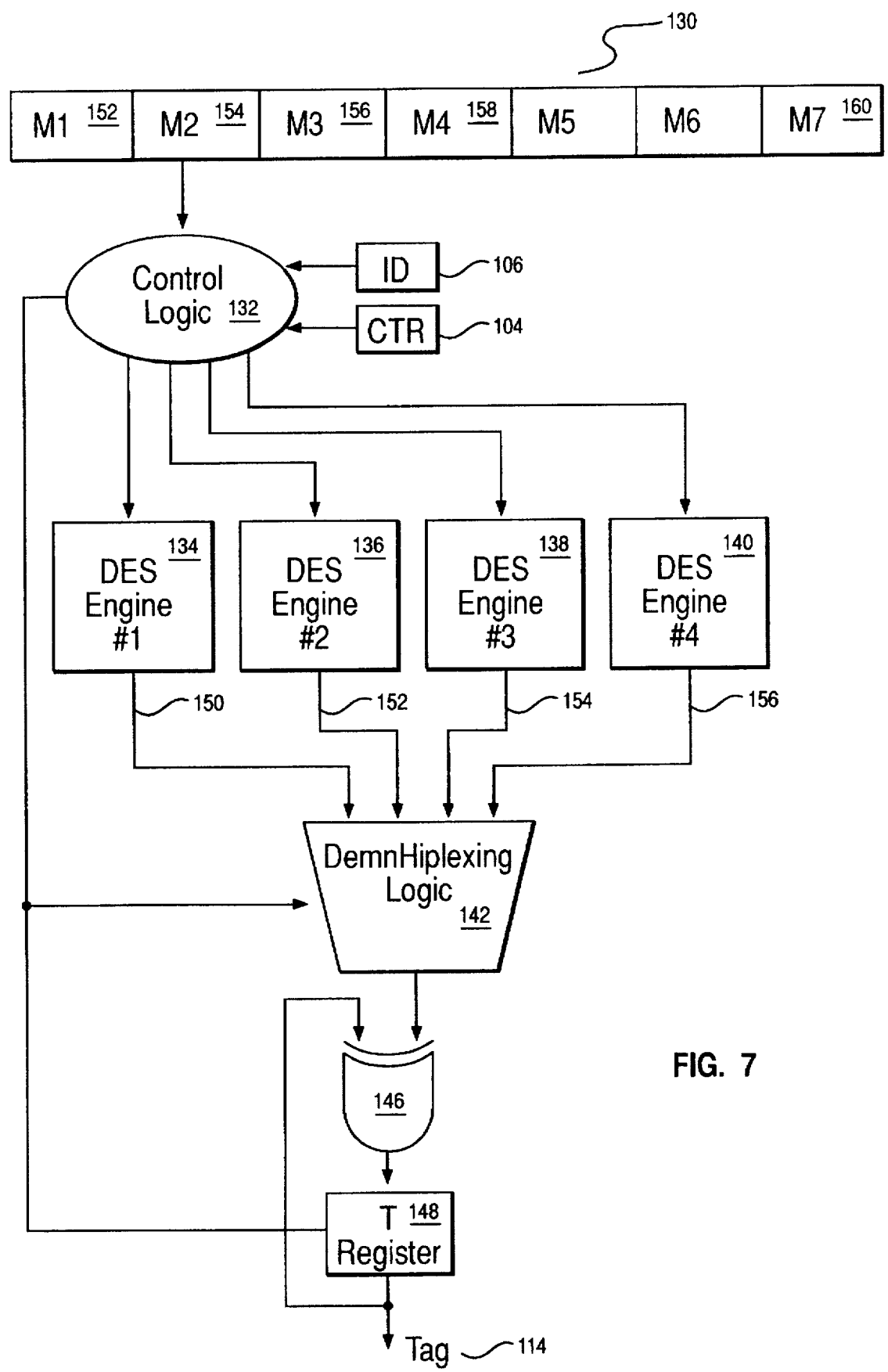
FIG. 7 depicts a physical depiction of MAC computation for either a sender of receiver in a data processing system.

FIG. 6 will now be described in detail, with reference to the apparatus depicted in FIG. 7. At time 0, the encoded ID 106 (FIG. 7) and CTR 104 (FIG. 7) are presented to DES Engine #1 (134 of FIG. 7) by control logic 132 (FIG. 7). Also at time 0, the temporary variable T (144 of FIG. 7), which is 64 bits in the preferred embodiment, Is initialized to all zeros. The ciphertext 150 (FIG. 7) emerges from the DES Engine #1 (134 of FIG. 7) at time 0+4=4 (one of the assumptions being that it takes four units of time for the DES encryption engine, as stated above). At this time, the ciphertext 150 is XOR'ed at 146 (FIG. 7) with the current value of running tag T (144 of FIG. 7).

At time 1, word 1 (152 of FIG. 7) of the message (130 of FIG. 7) is encoded by logic 132 of FIG. 7 (such encoding as previously described in reference to FIG. 4 above) and presented to DES engine #2 (136 of FIG. 7), from which it emerges at time 1+4=5. At that time, the resulting ciphertext 152 is XOR'ed at 146 with the current value of T (144 of FIG. 7).

At time 2, word 2 of the message (154 of FIG. 7) is encoded and presented to DES engine #3 (138 of FIG. 7). It emerges at time 2+4=6. At that time, the ciphertext 154 is XOR'ed at 146 with the current value of T (144 of FIG. 7).

At time 3, word 3 of the message (156 of FIG. 7) is encoded and presented to DES engine #4 (140 of FIG. 7). It emerges at time 3+4=7. At that time, the ciphertext 156 is XOR'ed at 146 with the current value of T (144 of FIG. 7).

At time 4, DES engine #1 (134 of FIG. 7) has just finished processing the encoding of ID and CTR, and word 4 (158 of FIG. 7) is now ready. It is presented to DES engine #1 (134 of FIG. 7), from which it emerges at time 4+4=8. At that time, the ciphertext is XOR'ed at 146 with the current value of T (144 of FIG. 7).

This process continues until all 7 words of message 130 have been consumed.

In the drawing, the last word of message (word 7 shown as 160 of FIG. 7) enters DES engine #4 (140 of FIG. 4) at time 7. When the ciphertext 156 emerges at time 7+4=11, it is XOR'ed at 146 with the current value of T (144 of FIG. 7). The result, either truncated at 148 or left in its entirety, is the tag 114 for the entire message 130.

Figure 9:
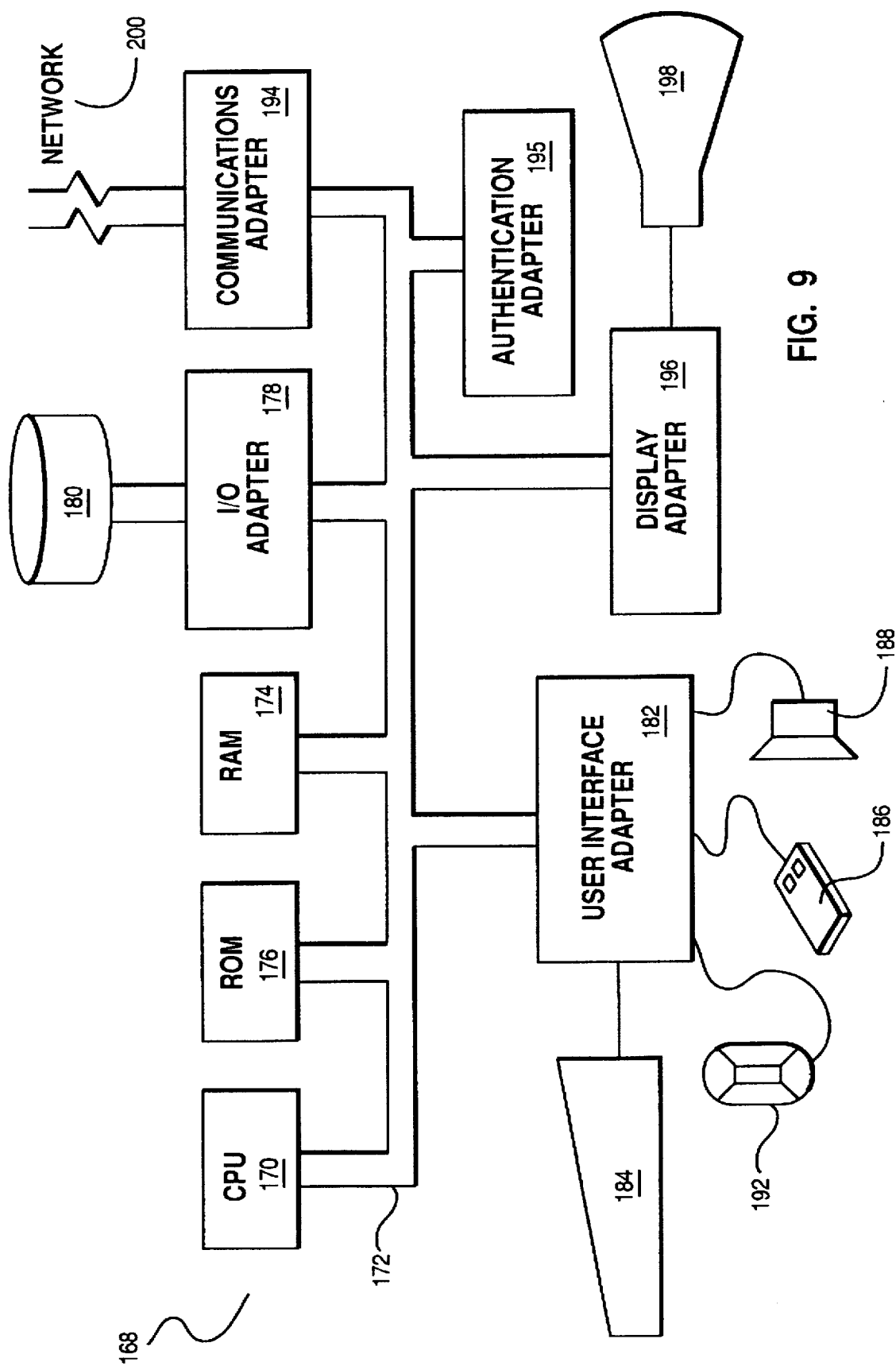
FIG. 9 depicts a representative data processing system.

FIG. 9 shows the preferred embodiment data processing system 168 for performing the above described operations, and comprises a CPU 170, read only memory (ROM) 176, random access memory (RAM) 174, I/O adapter 178, user interface adapter 182, communication adapter 194, authentication adapter 195, and display adapter 196 all interconnected via a common data path, or bus, 172. Each of the above components accesses the common bus using conventional techniques known to those of ordinary skill in the art, and includes such methods as dedicating particular address ranges to each component in the system, with the CPU being the bus master. Other conventional techniques known to those of ordinary skill in the art include direct memory access, or DMA, used to transfer data at high speed from external devices such as DASD 180 or network 200 to the data processing system's random access memory (RAM) 174. As is further shown in FIG. 9, these external devices 180 and 200 interface to the common bus 172 through respective adapters 178 and 194. Other external devices such as the display 198 similarly use an adapter 196 to provide data flow between the bus 172 and the display 198. User interface means are provided by adapter 182, which has attached thereto such items as a joystick 192, mouse 186, keyboard 184, and speaker 188. Each of these units is well known as such and so will not be described in detail herein.

FIG. 9 corresponds to FIG. 1 in the following manner. Network 200 of FIG. 9 corresponds to the insecure channel 20. The functions within the sender 12 of FIG. 1 are provided by data processor 168 and authentication adapter 195 of FIG. 9. The authentication adapter 195 comprises the logic and corresponding circuitry depicted in FIG. 7. In an alternate embodiment, the authentication adapter 195 could be merged with the communication adapter 194 to further enhance performance. The functions within the receiver 14 of FIG. 1 are provided by another data processor which may be the same type of, or may be a different type from, the data processor shown at 168 of FIG. 9.

While the invention has been particularly shown and described with reference to a preferred embodiment, it will be understood by those skilled in the art that various changes in form and detail may be made without departing from the spirit and scope of the invention.

We claim:

1. A method for determining an authentication tag for use in conjunction with transfer of data using a communication channel, comprising the steps of:

partitioning said data into a plurality of blocks;

for each of said blocks, encoding said block to create a word that represents both a value of said block and an identifier of said block;

applying a pseudo-random function to each said word to create a plurality of enciphered words; and combining said plurality of enciphered words to create a tag.

2. The method of claim 1 wherein said pseudo-random function is a data encryption standard algorithm.

3. The method of claim 1 wherein said blocks are of fixed length.

4. The method of claim 1 wherein said step of combining comprises a logical exclusive-or operation.

5. The method of claim 1 wherein said tag is truncated or otherwise reduced to a given length.

6. The method of claim 1 wherein said pseudo-random function is multi-staged.

7. The method of claim 6 wherein a plurality of said words are pipelined to said multi-staged pseudo-random function.

8. The method of claim 1 wherein a plurality of said words are concurrently presented to a plurality of said pseudo-random functions.

9. The method of claim 1 further comprising the step of combining at least said tag with said identifier to create a message authentication code.

10. The method of claim 9 further comprising the step of combining at least the data and the message authentication code to create a data packet.

11. A method for determining an authentication tag for use in conjunction with transfer of data using a communication channel, comprising the steps of:

partitioning said data into a plurality of blocks;

for each of said blocks, encoding said block to create a word that represents both a value of said block and an identifier of said block;

applying a pseudo-random function to (i) each said word and (ii) a header for said data to create a plurality of enciphered words; and combining said plurality of enciphered words to create a message authentication code.

12. The method of claim 11 wherein said pseudo-random function is a data encryption standard algorithm.

13. The method of claim 11 wherein said blocks are of fixed length.

14. The method of claim 11 wherein said step of combining comprises a logical exclusive-or operation.

15. The method of claim 11 wherein said header comprises an identifier and a counter.

16. The method of claim 11 wherein said tag is truncated or otherwise reduced to a given length.

17. The method of claim 11 wherein said pseudo-random function is multi-staged.

18. The method of claim 17 wherein a plurality of said words are pipelined to said multi-staged pseudo-random function.

19. The method of claim 11 wherein a plurality of said words are concurrently presented to a plurality of said pseudo-random functions.

20. The method of claim 11 further comprising combining at least said tag with said identifier to create a message authentication code.

21. The method of claim 20 further comprising the step of combining at least the data and the message authentication code to create a data packet.

22. A method for secure transfer of data using a nonsecure communication channel, comprising the steps of:

partitioning said data into a plurality of blocks;

for each of said blocks, encoding said block to create a word that represents both a value of said block and an identifier of said block;

applying a pseudo-random function to each said word to create a plurality of enciphered words;

combining said plurality of enciphered words to create a tag;

combining at least said data and said tag to create a data packet;

transmitting said data packet via said nonsecure communication channel;

receiving the data packet;

extracting the tag and the data from the data packet;

generating a second tag from at least the extracted data and a local key; and comparing the extracted tag and the second tag to determine data authenticity of the data packet.

23. A method for determining an authentication tag for use in conjunction with transfer of data using a communication channel, comprising the steps of:

partitioning said data into a plurality of blocks; concatenating to each of said blocks a block identifier to create a word;

applying a pseudo-random function to each said word to create a plurality of enciphered words; and combining said plurality of enciphered words to create a tag.

24. The method of claim 23 wherein said block identifier is based upon a block index.

25. The method of claim 23 wherein said pseudo-random function is multi-staged.

26. The method of claim 25 wherein a plurality of said words are pipelined to said multi-staged pseudo-random function.

27. A method for secure transfer of data using a nonsecure communication channel, comprising the steps of:

partitioning said data into a plurality of blocks;

for each of said blocks, encoding said block to create a word that represents both a value of said block and an identifier of said block;

applying a pseudo-random function to (i) each said word and (ii) an identifier for said data to create a plurality of enciphered words;

combining said plurality of enciphered words to create a tag;

combining at least the data and the tag to create a data packet;

transmitting the data packet via said nonsecure communication channel;

receiving a received data packet;

extracting received data and a received tag from the received data packet;

generating a local tag from at least the received data and a local key; and comparing the received tag and the local tag to determine data authenticity of the received data packet.

28. A method for secure transfer of data using a nonsecure communication channel, comprising the steps of:

partitioning said data into a plurality of blocks;

for each of said blocks, encoding said block to create a word that represents both a value of said block and an identifier of said block;

applying a pseudo-random function to (i) each said word and (ii) an identifier for said data to create a plurality of enciphered words;

combining said plurality of enciphered words to create a tag;

combining at least the data, the tag, a sender identity and a time variant parameter to create a data packet;

transmitting the data packet via said nonsecure communication channel;

receiving a received data packet;

decomposing the received data packet to extract received data, a received tag, a received sender identity and a received time variant parameter;

generating a local tag from at least the received data, the received sender identity, the received time variant parameter and a local key; and comparing the received tag and the local tag to determine data authenticity of the received data packet.

29. The method of claim 28 wherein said step of comparing further comprises comparing said received time variant parameter to a local time variant parameter to further determine said data authenticity.

30. The method of claim 29 wherein said received time variant parameter comprises a received counter.

31. The method of claim 29 wherein said received time variant parameter comprises a time stamp.

32. The method of claim 29 wherein said received time variant parameter comprises a sequence number.

33. A method for determining an authentication tag for use in conjunction with transfer of data using a communication channel, comprising the steps of:

partitioning said data into a plurality of blocks;

concatenating to each of said blocks a block identifier to create a word;

applying a pseudo-random function to (i) each said word and (ii) an identifier for said data to create a plurality of enciphered words; and combining said plurality of enciphered words to create a tag.

34. A method for determining authenticity of a received data packet, comprising the steps of:

extracting a plurality of blocks of received data, a received tag and a received time variant parameter from the received data packet;

generating a local tag from a plurality of enciphered words each representing a respective one of the plurality of blocks of the received data, the received time variant parameter and a local key; and comparing the received tag and the local tag to determine data authenticity of the received data packet.

35. The method of claim 34 wherein said received time variant parameter comprises a received counter.

36. The method of claim 34 wherein said received time variant parameter comprises a time stamp.

37. The method of claim 34 wherein said received time variant parameter comprises a sequence number.

38. The method of claim 34 wherein said received data packet further comprises a sender identity.

39. The method of claim 38 further comprising obtaining said local key from a local table using said sender identity.

40. A system for determining an authentication tag for use in conjunction with transfer of data using a communication channel, comprising:

means for partitioning said data into a plurality of blocks;

means for encoding each of said blocks to create a word that represents both a value of each of said blocks and an identifier of each of said blocks;

means for applying a pseudo-random function to each said word to create a plurality of enciphered words; and means for combining said plurality of enciphered words to create a tag.

41. A system for determining an authentication tag for use in conjunction with transfer of data using a communication channel, comprising:

means for partitioning said data into a plurality of blocks;

means for combining with each of said blocks a block identifier to create a word;

means for applying a pseudo-random function to (i) each said word and (ii) an identifier for said data to create a plurality of enciphered words; and means for combining said plurality of enciphered words to create a tag.

42. A system for determining authenticity of a received data packet, comprising:

means for extracting a plurality of blocks of received data, a received tag and a received time variant parameter from the received data packet;

means for generating a local tag from a plurality of enciphered words each representing a respective one of the plurality of blocks of the received data, the received time variant parameter and a local key; and means for comparing the received tag and the local tag to determine data authenticity of the received data packet.

43. The system of claim 42 wherein said received data packet further comprises a sender identity.

44. The system of claim 43 further comprising means for accessing said local key from a local table using said sender identity.

* * * * *